(No Model.)

W. H. BEDELL.
TRACTION TRUCK.

No. 376,703. Patented Jan. 17, 1888.

WITNESSES
H. B. Harris
Ben. Fugitt

INVENTOR
W. H. Bedell
by E. W. Anderson
his Attorney

UNITED STATES PATENT OFFICE.

WILLIAM H. BEDELL, OF SAYVILLE, NEW YORK.

TRACTION-TRUCK.

SPECIFICATION forming part of Letters Patent No. 376,703, dated January 17, 1888.

Application filed March 9, 1887. Serial No. 230,258. (No model.)

*To all whom it may concern:*

Figure 1:
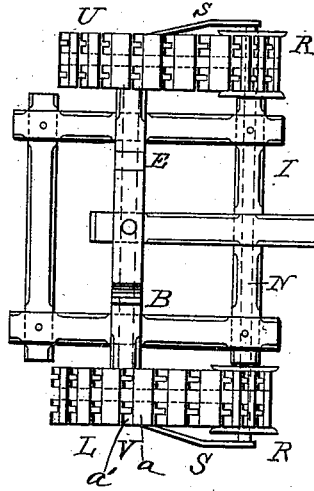
Figure 1:
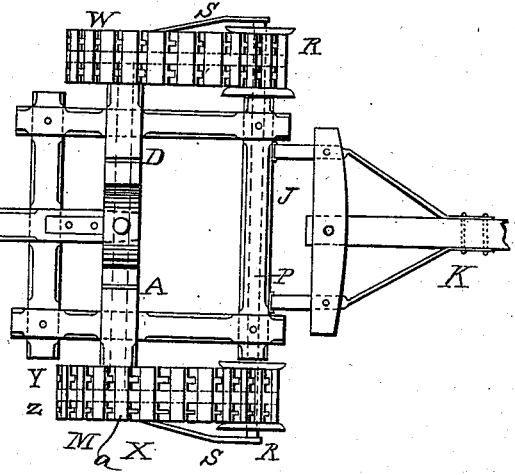
Figure 4:
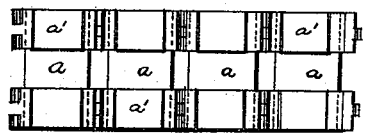
Figure 2:
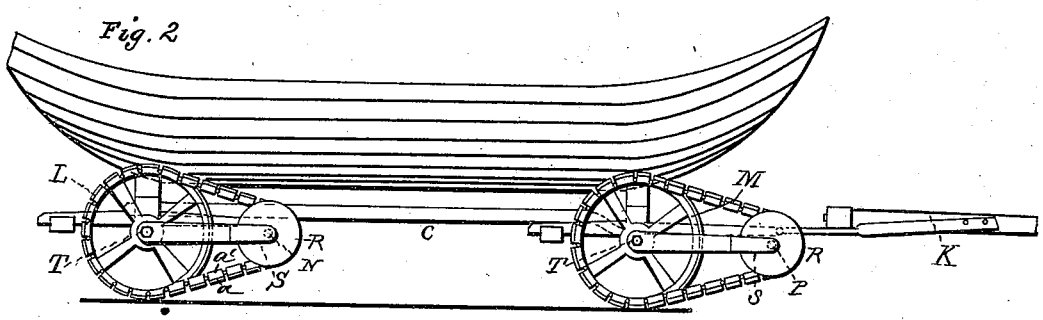
Figure 3:
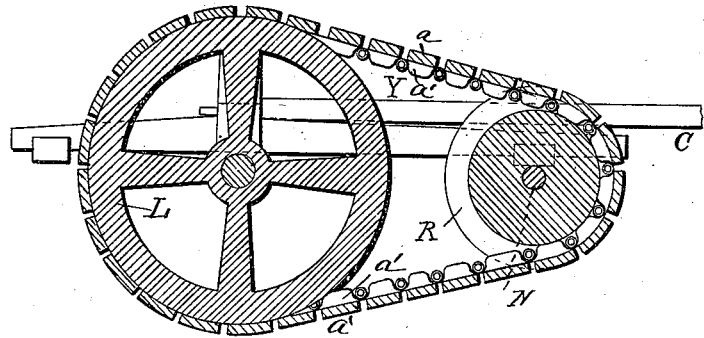

Be it known that I, WILLIAM H. BEDELL, a citizen of the United States, residing at Sayville, in the county of Suffolk and State of New York, have invented certain new and useful Improvements in Traction-Trucks; and I do declare the following to be a full, clear, and exact description of the invention, such as will enable others skilled in the art to which it appertains to make and use the same, reference being had to the accompanying drawings, and to letters or figures of reference marked thereon, which form a part of this specification.
Figure 1 of the drawings is a representation of a top view of my invention. Fig. 2 is a side elevation of my invention with a boat shown on the carriage. Fig. 3 is a vertical longitudical section through middle of hind wheel. Fig. 4 is a detail view of a part of one of the traction-belts.

My invention relates to traction trucks designed, principally, for Government service for boat-wagons and heavy ordnance on sandy-beach life-saving stations and the like; and it consists in the construction and novel combination of parts, as hereinafter set forth.

Referring by letter to the accompanying drawings, A designates the front axle, B the rear axle, and C the reach, of the truck.

D is the front axle-stock, and E the rear axle stock.

I designates the rear hounds, and J the front hounds.
K is the tongue, which is connected to the front hounds.

L designates the hind wheels, and M the front wheels, of the truck.

N and P are transverse shafts, which are secured to the lower faces of the front transverse bars of the front and rear hounds, respectively, by eyebolts or otherwise, said shafts N P extending laterally beyond the ends of the transverse bars, to which they are secured.

R R are long spools, flanged at each end and turning loosely on the projecting ends of the shafts N and P, and are prevented from slipping off the shafts by the spring-guards S, the heads of which rest on the ends of the shaft, their rear ends being fitted upon the ends of the front and rear axles and kept in place by nuts T. The guards can be thus easily detached and the spools removed when necessary.

Traction-belts U, V, W, and X encircle each wheel and the flanged guide-spool immediately in front of it. Each traction-belt comprises two parallel endless link belts, Y Z, the links $a'$ of said belts being connected in pairs by transverse slats $a$, securely riveted or bolted to the outsides of the links $a'$, the peripheries of the wheels L M engaging the inner faces of the slats at points between the parallel link belts, so that when the truck is drawn along the link belts form the track upon which the truck travels, thereby preventing the wheels from sinking into the sand or soil. The links also, by engaging against the sides of the wheels L and M, prevent the wheels from slipping off the belt, which by extending beyond the wheel is given a very broad tread. The belts engage the spools between the flanges thereof, and are thus prevented from slipping.

In the illustrations I have shown a boat in position to be moved from one place to another over the sandy beach. It is evident that heavy ordnance can be moved in the same manner after having been loaded on the truck.

The flanged spools, in connection with the supporting-wheels of the truck, convert the endless link belts into a continuous track, which is at all times properly laid by simply drawing the truck along.

Having described this invention, what I claim, and desire to secure by Letters Patent, is—

In a traction-truck, the combination, with the vehicle-gear, axles, and wheels, constructed substantially as described, of the transverse shafts N and P, secured, respectively, to the rear and front hounds, the spools loose on the ends of said shafts and provided with encircling flanges at each end, the detachable spring-guides S, and the traction-belts, each composed of the two endless link belts Y Z and the slats $a$, connecting the outer sides of opposite members of the two belts, and with their inner surfaces between the belts Y and Z forming a tread for the truck-wheels, substantially as specified.

In testimony whereof I affix my signature in presence of two witnesses.

WILLIAM H. BEDELL.

Witnesses:
C. N. ALDRICH,
WM. F. LECLUSE.